United States Patent

[11] 3,581,651

[72] Inventor Donald E. Johnson
 10355 Harriet Ave. S., Minneapolis, Minn. 55420
[21] Appl. No. 847,105
[22] Filed Aug. 4, 1969
[45] Patented June 1, 1971

[54] DEVICE FOR TENDERING AND SEASONING MEAT
 5 Claims, 6 Drawing Figs.
[52] U.S. Cl. ................................................. 99/254, 17/30
[51] Int. Cl. ....................................................... A22c 9/00
[50] Field of Search ........................................... 99/254, 256, 345; 17/25, 30

[56] References Cited
UNITED STATES PATENTS
3,441,980 5/1969 Defenbaugh .................. 99/254X FOREIGN PATENTS
508,746 7/1939 Great Britain ................. 17/30

Primary Examiner—William I. Price
Attorney—Williamson, Palmatier and Bains

ABSTRACT: A device for simultaneously tenderizing and interspersing seasoning and tenderizing materials in meat, which employs a body having a combination handle and reservoir for seasoning and tenderizing materials on the top thereof and which includes a rigid head having sockets or the equivalent for detachably receiving a multiplicity of prongs or penetration blades. The foregoing structure is combined with a series of liquid or powder passages or ports communicating the contents of said reservoir with the side and peripheral portions of the blades whereby reciprocation of the entire device will not only penetrate and spread tissues and fibers of the meat but, by wiping action in downward and upward reciprocations, will intersperse and spread a tenderizing or seasoning material throughout the thickness of the meat.

Patented June 1, 1971 3,581,651

INVENTOR.
DONALD E. JOHNSON
BY
Williamson Palmatier & Bains
ATTORNEYS

DEVICE FOR TENDERING AND SEASONING MEAT

This invention relates to a device for simultaneously tenderizing and interspersing seasoning and tenderizing materials in meat whereby a steak or other chunk of meat may be pierced with a multiplicity of prongs to spread tissues, membranes and tendons thereof and whereby simultaneously to insertion and withdrawal of such prongs seasoning and/or tenderizing materials are simultaneously channeled, released and injected into the full thickness of the meat.

The prior art shows a substantial number of various devices intended for manual operation having depending prongs connected with a handle member and, in some instances, having hammer members provided with irregular projections, corrugations or the like, the essential purpose of said devices being to spread apart and loosen tissues, fibers and tendons of the meat to facilitate chewing and mastication thereof giving more palatable taste effects. In a few instances, large-scale commercial machines have been employed provided with prongs or penetration elements for reciprocation into meat chunks, but said machines have not provided positive means for channeling and simultaneously interspersing seasoning, flavoring and tenderizing materials throughout the thickness of the meat in a satisfactory manner.

It is an object of my invention to provide an economical, compact and highly efficient device which utilizes a multiplicity of meat penetration prongs closely combined with a reservoir containing seasoning and/or meat tenderizing materials together with channels communicating the lower portion of said reservoir with the side and other surfaces of the prongs or blades to effectively intersperse such materials throughout the thickness of the meat during penetration and retracting of the prongs or blades.

A further object is the provision of a tenderizing and seasoning device of small compact form adapted to be manually reciprocated and wherein components and parts thereof have dual or multifunctions to reduce and simplify the essential of cooperating parts.

Another object is the provision of a tenderizing and seasoning device for meat of the class described wherein all parts of the device may be readily sterilized for health purposes and wherein replacement of the meat penetration elements may be easily and inexpensively effected.

The foregoing and other objects of the invention will be more fully apparent from the accompanying drawings wherein like reference characters refer to similar parts throughout the several views and in which.

Figure 1:
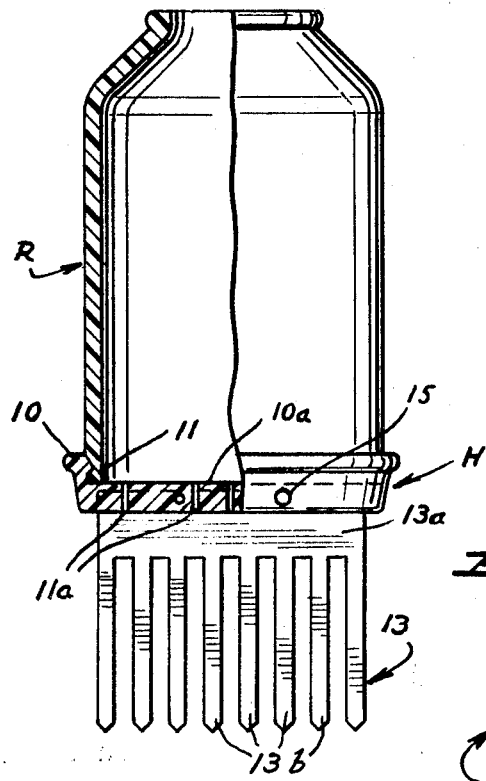
FIG. 1 is an elevation of one side of the device assembled with the combination handle member and reservoir attached to the head of the tenderizer.
Figure 2:
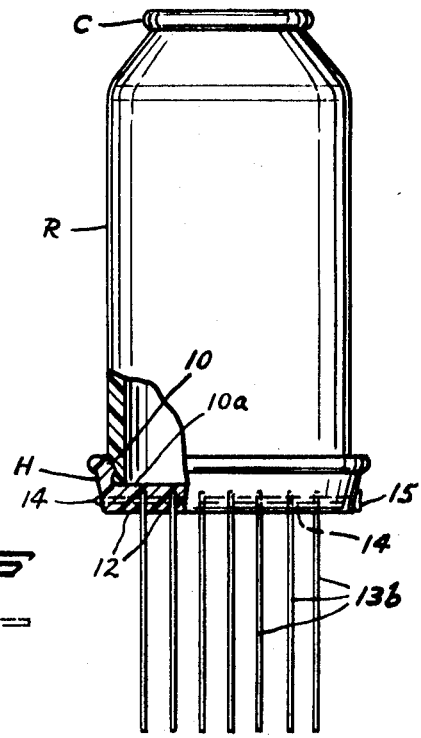
FIG. 2 is an elevation of the adjacent side of the assembled device with some portions broken away to show interior construction.
Figure 3:
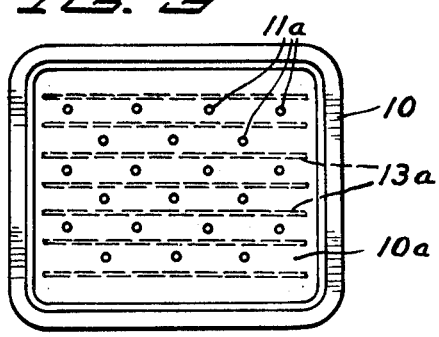
FIG. 3 is a top plan view of the head of the penetration device showing in full lines the communication channels or ports for channeling seasoning and other fluid material to the side and external surfaces of the several blades, and also indicating in dotted lines the shouldered reception of the penetration prongs or blades which are preferably formed similar to combs in flat plate material.

Referring now to the form of my invention shown in FIGS. 1 to 3 inclusive, a rigid head H for the penetration blades is provided made of suitable material, such as stainless steel or hard plastic, and having, as shown, a top peripheral attachment bead 10 for receiving the elastic skirt 11 of a combination reservoir and handle member, designated in its entirety by the letter R. The head H is shown of generally rectangular shape, although it will of course be understood that circular, oval or many other general shapes may be employed. The top of the head H is generally recessed inwardly of the bead 10 to provide a substantially planar surface 10a through which a multiplicity of vertical channels 11a are formed for communicating liquid or powder in the reservoir and recessed portion of the head with the direct and intermediate sides of the several piercing blades or prongs, later to be described in detail.

In the underside of head H are formed a plurality of vertical narrow grooves 12 extending from the bottom of the head inwardly to a plane disposed below the surface 10a, each of said grooves being dimensioned in height for receiving and reinforcing the body and upward portion 13a of a comb-formed penetration unit 13 which has formed therein a multiplicity of depending penetration blades or prongs 13b. The prong blades 13b, as shown, are rather thin and have a width approximating an eighth of an inch and the lower and free ends thereof are preferably tapered to sharp points.

It will be understood that several of the comb blade elements are employed, disposed and seated in the abutment slots and channels 12 in parallel relation. Suitable means, such as a pair of retaining pins 14 having at one end a knurled handle 15, is provided which extends through suitable transverse horizontal apertures in the head member and which also extend through an interlock each of the bodies 13a of the respective comb blades.

The comb blade units 13 may be inexpensively stamped from stainless steel or other substantially rigid metal having resilient qualities and it will be understood that the prong blades 13b of adjacent units 13 may be transversely aligned or may be staggered transversely, all within the scope of my invention.

Referring again to the channels 11a, for transmitting and directing material from the chamber above head H, it will be noted that each of the channels is substantially vertically disposed with its lower end disposed immediately adjacent the side surface of one or more of the blades 13b.

The reservoir R is of course hollow and, as shown, has an upper beaded end R-1 which is adapted to be rigidly engaged and sealed with a plastic cap member C of conventional structure.

As shown in FIGS. 1 and 2, the combination reservoir and handle R is secured and sealed with the head H along the attachment head 10 and has been filled or partially filled, after removal of the top cap C, with a seasoning liquid or with a mixture of seasoning material and tenderizing powder, such as the type having enzymes and seasoning therein. If desired, the reservoir R may be inverted with the cap C secured and sealed therewith to receive the tenderizing and seasoning material prior to application or connection of the head H therewith.

OPERATION

With the parts of the device interconnected and disposed as shown in FIGS. 1 and 2, the device is grasped by the intermediate portion of reservoir R, including if desired the sealing skirt 11 and reciprocated in a direction normal to the surface of the steak or other mass of meat to be tenderized and seasoned.

In the inward or penetration action of prongs 13b, material carried by the intermediate and lower portions of the prongs 13b will be carried and interspersed within the mass of meat and throughout the thickness thereof. The retraction of the prongs 13b spreads the seasoning and/or tenderizing material upwardly throughout the various fibers and tissues which have been originally spread and distorted in the penetration stroke of the device.

The overall device is of course reciprocated a large number of times throughout the thickness of the piece of meat so that actual penetration of most of the cross-sectional area of the meat is accomplished.

While the distribution and dispersal of the material is not by actual injection, the dispersion and penetration of the seasoning and other material is improved and more thorough than could be accomplished by individual injector needles applied to the meat, since particularly in the subsequent and sequential reciprocating strokes the medium channeled first through the ports 11a and then channeled by the sides and surfaces of the blades is spread in the reciprocating action among the tissues, tendons and membranes which have been pried apart and distorted by the penetration action of the prongs 13b.

Figure 6:
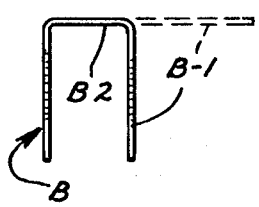
FIG. 6 is a side elevation showing a blade or prong unit of a modified construction.
Figure 4:
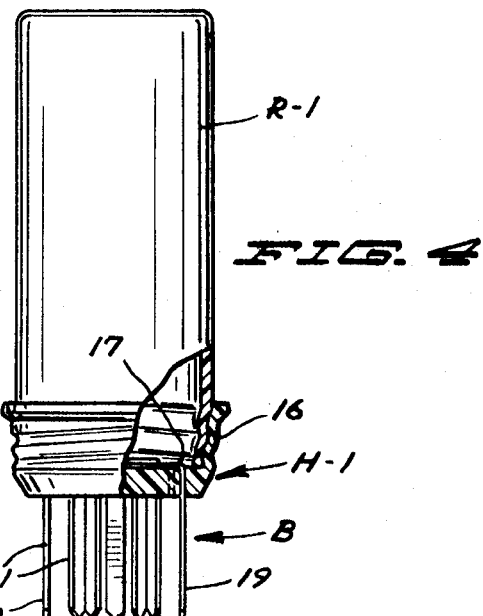
FIG. 4 is a perspective view of another form of my invention shown in assembled form.
Figure 5:
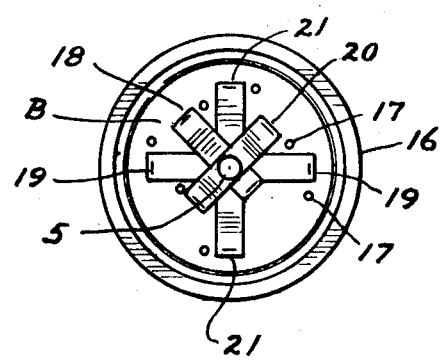
FIG. 5 is a top plan view of the meat-piercing head with the combination handle and reservoir removed and showing one means for structure and attachment of the removable penetration blades.

In FIGS. 4 and 5, another embodiment of my invention is shown wherein the head, indicated as an entirety by the letter H-1, is of general cylindrical shape having an upstanding internally threaded bead 16 which receives the threaded external open end of a cylindrical reservoir R-1, which may be constructed of glass, metal or plastic. The head H-1 (FIG. 5) has an upper planar surface 17 which has the function of retaining and securing a multiplicity of U-shaped prong or blade elements, indicated as an entirety by the letter B. As shown, the central portion of the head H-1 includes several series of spaced slots through which the prongs B-1 of the elements B extend. FIG. 6 illustrates one of the blade elements detached, the dotted line indicating the original position of a prong B-1 before it is bent into the position shown in full lines. Thus each element B includes a pair of the blades or prongs B-1 which are projected through the appropriate slots, as shown in four sets numbered on FIG. 5 as 18, 19, 20 and 21, respectively. The blade assemblies or units have their intermediate portions B-2 overlapped axially and centrally of the head H-1 and all of the units B are centrally apertured so that a single retaining element, such as a broad-headed screw S, may be threaded in the head H-1 to clamp all of the blades in operative position.

It will be understood that both forms of my invention may be employed to disperse either finely granulated seasoning and/or tenderizing material or liquid. The reservoirs R and R-1 are preferably made of somewhat flexible or collapsible material in the central portions thereof whereby, in using liquid seasoning material, hand pressure may be applied to the middle of the reservoir as the blades are reciprocated to assist in the discharge of liquid from the exteriors of the prongs or blades.

It will be seen that the U-shaped blade units B may be readily replaced and at intervals removed for thorough sterilizing of all of the parts, and of course with the reservoir are all detachable.

From the foregoing description, it will be seen that I have provided a simple but highly efficient device for simultaneously tenderizing and interspersing seasoning and the like in chunks of meat. While the device is mainly applicable as a manually operated device, the principles thereof, including the rigid head with the reservoir and the removable blades may be applied to a mechanically actuated head reciprocated by motor or other means.

In both forms of the invention the device is readily disconnectable for thoroughly sterilizing and cleansing all of the parts thereof.

What I claim is:

1. A device for simultaneously tenderizing and seasoning meat and the like having in combination, a head having a material reservoir for containing seasoning and the like attached thereto and serving also as a handle for the device, said head having means therein for retaining a plurality of tenderizing prongs, said prongs depending perpendicularly from said head and terminating in points, and having external side surfaces continuing upwardly to points adjacent the bottom of said head, said head having extending therethrough material guiding channels, the lower ends of said channels communicating with the exterior surfaces of said prongs.

2. The structure set forth in claim 1 wherein said prongs are constructed in multiple prong units each having an upper attachment portion securable to said head.

3. The structure set forth in claim 2 wherein said prongs are made up into comblike units constructed of sheet material and said prongs being in the form of depending blades, and each of said units having an upper body insertable and connectable to said head in a slit provided at the underside of said head.

4. The structure set forth in claim 1 wherein said head has peripherally disposed means for detachable connection and sealing with the lower end of said material reservoir, the lower end of said material reservoir communicating with said material-guiding channels.

5. The structure set forth in claim 1 wherein said prongs are constructed in units of U-shape configuration inverted with respect to said head and reservoir and having the middle portion of the U-shape construction overlying a surface of said head with said prongs depending through slots formed in said head.